United States Patent
Ide

(10) Patent No.: US 8,427,729 B2
(45) Date of Patent: Apr. 23, 2013

(54) LIGHT ADJUSTING APPARATUS

(75) Inventor: Takayuki Ide, Fussa (JP)

(73) Assignee: Olympus Corporation, Tokyo (JP)

( * ) Notice: Subject to any disclaimer, the term of this patent is extended or adjusted under 35 U.S.C. 154(b) by 77 days.

(21) Appl. No.: 13/117,248

(22) Filed: May 27, 2011

(65) Prior Publication Data

US 2011/0292484 A1  Dec. 1, 2011

(30) Foreign Application Priority Data

May 27, 2010  (JP) ................................. 2010-121663

(51) Int. Cl.
*G02B 26/02* (2006.01)

(52) U.S. Cl.
USPC .......................................................... 359/230

(58) Field of Classification Search .................. 359/230, 359/823, 824

See application file for complete search history.

(56) References Cited

U.S. PATENT DOCUMENTS 5,489,959 A * 2/1996 Akada ........................... 396/508

FOREIGN PATENT DOCUMENTS

| JP | 2000-152591 | 5/2000 |
|----|-------------|--------|
| JP | 4021077 | 10/2007 |

* cited by examiner

*Primary Examiner* — Euncha Cherry
(74) *Attorney, Agent, or Firm* — Scully Scott Murphy & Presser, PC

(57) ABSTRACT

A light adjusting apparatus including: first and second substrates, at least one of which has an aperture; a spacer which defines a distance between the first and second substrates; at least one incident light adjuster which includes a shaft member as a center of rotation and rotates between the first and second substrates in a plane orthogonal to an optical axis direction, a magnet being formed on at least part of the shaft; at least one driving device which includes a coil formed separately from the magnet, and drives the incident light adjuster; wherein the driving device rotates the incident light adjuster between a position at the aperture and a position to retract from the position of the aperture, further comprising a guide portion which is formed on the first substrate to restrict movement of the shaft member in directions other than a rotation direction thereof.

18 Claims, 10 Drawing Sheets

LIGHT ADJUSTING APPARATUS

CROSS-REFERENCE TO RELATED APPLICATION

The present application is based upon and claims the benefit of priority from the prior Japanese Patent Application No. 2010-121663 filed on May 27, 2010; the entire contents of which are incorporated herein by reference.

BACKGROUND OF THE INVENTION

1. Field of the Invention

The present invention relates to a light adjusting apparatus.

2. Description of the Related Art

A wide variety of systems have been conventionally implemented as light adjusting apparatuses. As one of such systems, a drop-in type light adjusting apparatus (e.g., drop-in iris) in which a single or a plurality of optical elements are mutually moved into and away from an optical path by an electromagnetic driving source or a different type of driving source to vary optical characteristics of the incident light passing through the optical path is known.

In recent years, along with improvements in image resolution and quality of small imaging devices such as mobile gear having an imaging capability or micro video scopes, the demand for the adoption of an adjustable focus lens, an adjustable diaphragm and an optical-characteristic variable filter than optical elements such as a lens, a diaphragm and an optical filter instead of a conventional fixed-focus lens, a conventional fixed diaphragm and a conventional optical-characteristic invariable filter, respectively, has been keen. As a light adjusting apparatus applicable to such small imaging devices, the aforementioned drop-in type light adjusting apparatus has been attracting attention as a light adjusting apparatus suitable for miniaturization because the drop-in type light adjusting apparatus is simple in structure.

As an example of such a drop-in type light adjusting apparatus suitable for miniaturization is disclosed in Japanese Patent No. 4021077. In this patent, a rotor coupled to shutter blades is supported by a shaft and a hole which are formed on a shutter base plate and a cover frame, respectively, in a manner to be rotatable, and this support structure stabilizes the rotational movement of the rotor (see FIG. 2 and other figures of Japanese Patent No. 4021077).

However, in the structure disclosed in Japanese Patent No. 4021077, the cover frame and the shutter base plate need to be joined to each other with high precision so that the aforementioned shaft, which is formed on the shutter substrate, the aforementioned rotor, and the aforementioned hole, which is formed on the cover frame, are aligned on a common axis.

If the axes of the aforementioned shaft, rotor and hole mutually deviate, this deviation becomes an obstacle to the rotational movement of the rotor. On the other hand, if the tolerance in displacement between these axes is set to a great value, the rotational movement of the rotor becomes unstable, which is a problem.

The influence caused by the assembling accuracy of components such as described above becomes noticeable as the device decreases in size, and it becomes extremely difficult to achieve a configuration such as disclosed in Japanese Patent No. 4021077 if the size of the light adjusting apparatus is in the order of a few millimeters.

SUMMARY OF THE INVENTION

The present invention has been made in view of the foregoing circumstances, and an object of the present invention is to provide a light adjusting apparatus which is easy to assemble and the product accuracy of which is easy to maintain at a high level though simple in structure, low in production cost, light in weight, compact in size and small in thickness.

To overcome the above-described drawbacks and achieve the object mentioned above, according to the present invention, there is provided a light adjusting apparatus which includes: a first substrate and a second substrate at least one of which has an aperture;

a spacer which defines a distance between the first substrate and the second substrate;

at least one incident light adjuster which includes a shaft member as a center of rotation and rotates between the first substrate and the second substrate in a plane orthogonal to an optical axis direction, a magnet being formed on at least part of the shaft;

at least one driving device which includes a coil formed separately from the magnet, and drives the incident light adjuster; wherein the driving device rotates the incident light adjuster between a position at the aperture and a position to retract from the position of the aperture, further comprising a guide portion which is formed on the first substrate to restrict movement of the shaft member in directions other than the rotation direction thereof.

The light adjusting apparatus according to the present invention, it is preferable that the guide portion restricts the movement of the shaft member in the directions on an inner wall side of the guide portion.

The light adjusting apparatus according to the present invention, it is preferable that the light adjusting apparatus can be characterized in that both ends of the coil face the magnet through at least part of the guide portion.

The light adjusting apparatus according to the present invention, it is preferable that the guide portion is made of a non-magnetic material.

The light adjusting apparatus according to the present invention, it is preferable that both ends of the coil are in contact with an outer wall of the guide portion.

The light adjusting apparatus according to the present invention, it is preferable that the guide portion is formed into a separate member from the first substrate.

The light adjusting apparatus according to the present invention, it is preferable that the guide portion is formed integrally with the first substrate by deforming a part of the first substrate.

The light adjusting apparatus according to the present invention, it is preferable that the inner wall of the guide portion is smaller in dimension than an opening formed through the second substrate, wherein the shaft member is inserted into the opening. In this case, the dimension of the inner wall of the guide portion refers to the diameter thereof if the inner wall of the guide portion is in the shape of a cylinder, and the dimension of the inner wall of the guide portion refers to the length of one side thereof if the inner wall of the guide portion is in the shape of a rectangle.

The light adjusting apparatus according to the present invention, it is preferable that an aperture is formed through the incident light adjuster.

The light adjusting apparatus according to the present invention, it is preferable that the incident light adjuster comprises a lens.

The light adjusting apparatus according to the present invention, it is preferable that the incident light adjuster comprises an optical filter.

DETAILED DESCRIPTION OF THE INVENTION

Figure 1:
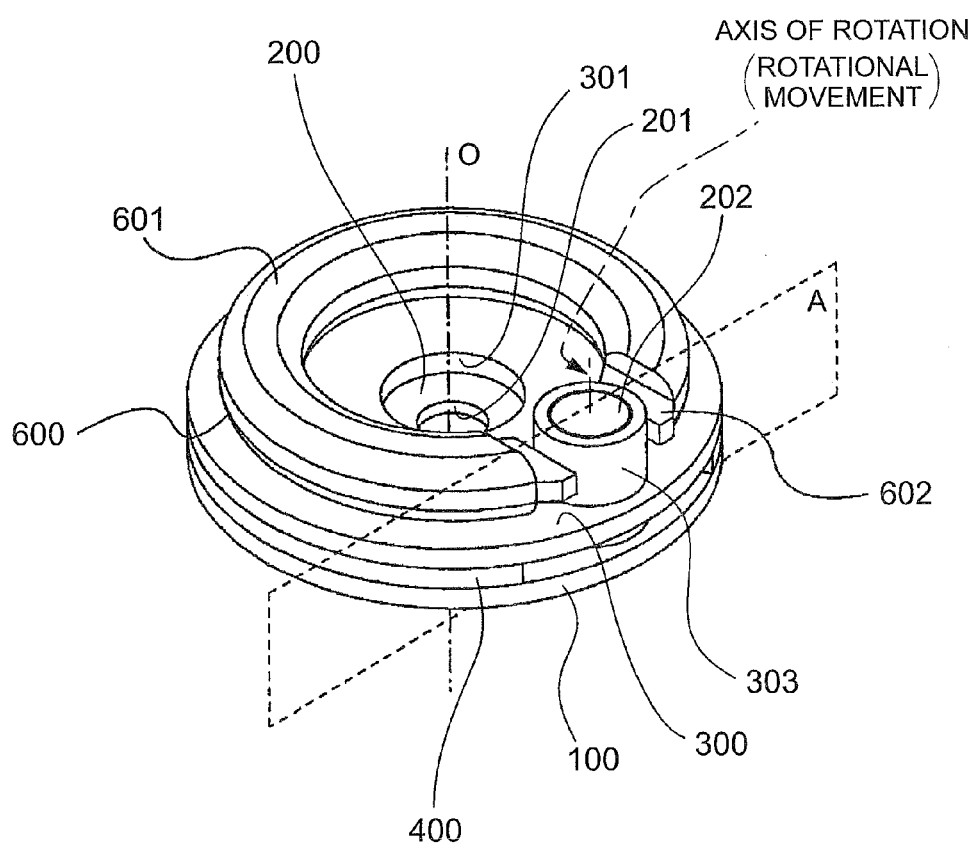
FIG. 1 is a perspective view of a first embodiment of a light adjusting apparatus (adjustable diaphragm) according to the present invention.

Embodiments of a light adjusting apparatus according to the present invention will be hereinafter discussed in detail with reference to the accompanying drawings. However, it should be noted that the present invention is not limited to the particular embodiments discussed below. Note that identical or similar elements in the embodiments discussed below are designated by the same reference numerals.

<First Embodiment>

In this embodiment, an adjustable diaphragm which regulates the quantity of light passing through an aperture formed through an aperture plate by moving the aperture plate into and away from an optical path will be discussed hereinafter as an example of the light adjusting apparatus according to the present invention.

The structure of a first embodiment of this adjustable diaphragm will be hereinafter discussed with reference to FIGS. 1 and 2.

Figure 2:
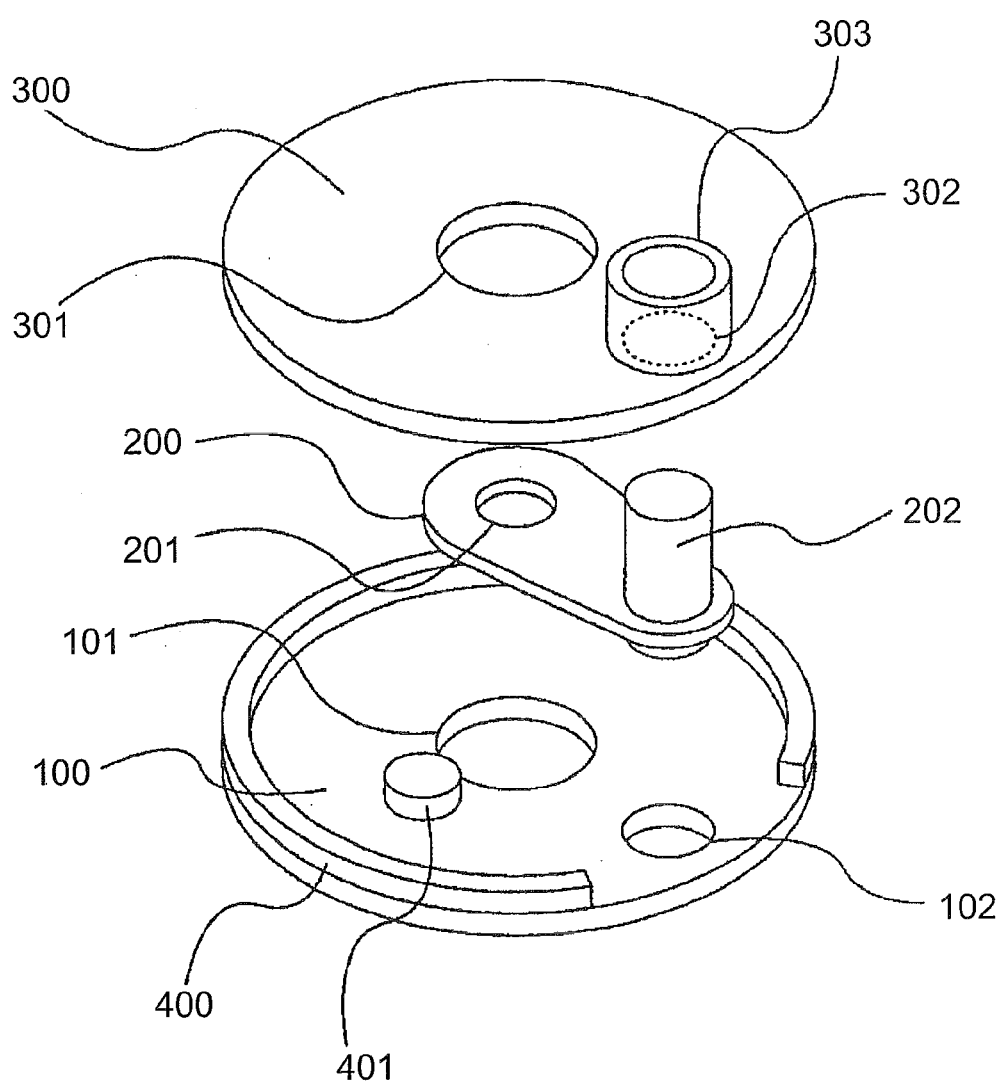
FIG. 2 is an exploded perspective view of the light adjusting apparatus (adjustable diaphragm) shown in FIG. 1 with a coil removed.

FIG. 1 is a perspective view of the first embodiment of the adjustable diaphragm and FIG. 2 is an exploded perspective view of the adjustable diaphragm shown in FIG. 1 with a coil removed.

As shown in FIGS. 1 and 2, the first embodiment of the adjustable diaphragm is composed of a lower substrate 100, an aperture plate 200, an upper substrate 300, a spacer 400 and a coil 600. The lower substrate 100 is provided with a first aperture 101, a positioning portion 401 and a bearing hole 102. The aperture plate 200 is provided with a second aperture 201, and a shaft member 202 made of a columnar magnet is joined to the aperture plate 200. The upper substrate 300 is provided with a third aperture 301, a bearing hole 302 and a guide portion 303. The coil 600 is provided with coil strands 601 and a core 602 around which the coil strands 601 are wound.

Each of the aforementioned elements will be hereinafter discussed in detail with reference to FIGS. 1 through 3.

Figure 3:
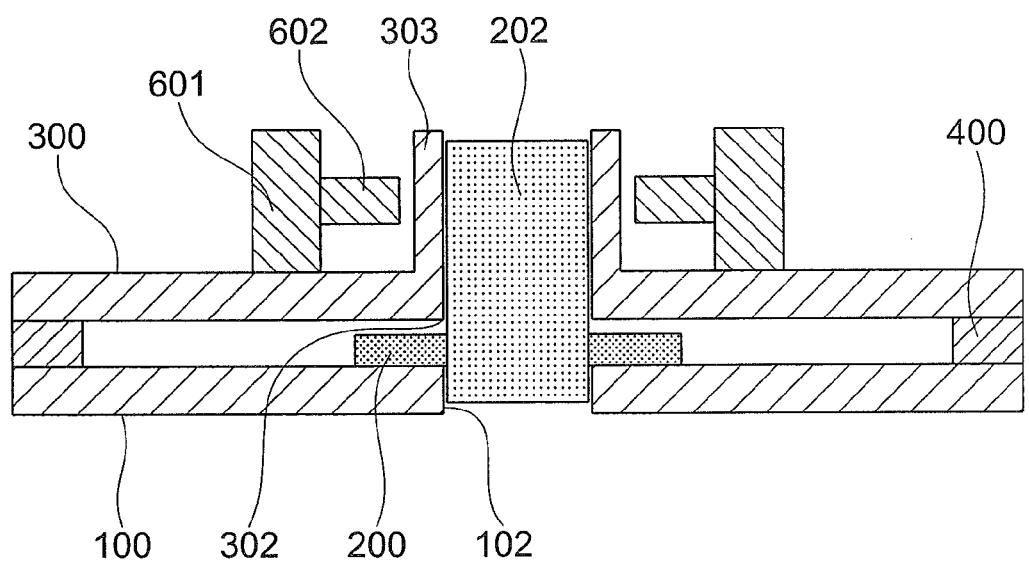
FIG. 3 is a cross sectional view of the light adjusting apparatus (adjustable diaphragm) shown in FIG. 1, taken along the plane A shown in FIG. 1 in which the rotation axis of a shaft member lies.

FIG. 3 shows a cross sectional view of the adjustable diaphragm shown in FIG. 1, taken along the plane A shown in FIG. 1 in which the rotation axis of the shaft member 202 lies.

As shown in FIGS. 1 through 3, the first aperture 101 and the third aperture 301 are formed through the lower substrate 100 and the upper substrate 300, respectively, and the bearing hole 102 and the bearing hole 302 are formed through the lower substrate 100 and the upper substrate 300 to be coaxial with each other, respectively.

Additionally, the positioning portion 401 is formed on the lower substrate 100, and the guide portion 303 is formed on the upper substrate 300.

The first aperture 101 and the third aperture 301 are aligned so that the central axes thereof serve as an optical axis O, thereby forming an optical path through which the incident light passes. The first aperture 101 and the third aperture 301 are formed to be mutually identical or different in aperture size, and the aperture size thereof (smaller aperture size in the case where the first aperture 101 and the third aperture 301 are mutually different in aperture size) corresponds to the full aperture size of the adjustable diaphragm.

The bearing holes 102 and 302 are formed to be substantially identical in diameter to the shaft member 202.

The guide portion 303 is hollow-cylindrical in shape and formed so that the inner diameter thereof is substantially identical to the outer diameter of the shaft member 202. With this formation, the inner wall of the guide portion 303 is continuous with the bearing hole 302.

In addition, the guide portion 303 is formed so that the height thereof substantially corresponds to the amount of projection of the shaft member 202 from the upper substrate 300.

The positioning portion 401 is formed on the lower substrate 100 so that the center of the second aperture 201 coincides with the optical axis O when the aperture plate 200 is in a position where it contacts the positioning portion 401.

The spacer 400 is an element for defining the distance and the relative position between the lower substrate 100 and the upper substrate 300.

The second aperture 201 that is formed on the aperture plate 200 is smaller in aperture size than either of the first aperture 101 and the third aperture 301 that are formed through the lower substrate 100 and the upper substrate 300, respectively.

The shaft member 202, which is made of a columnar magnet, is joined to the aperture plate 200 by a joining method such as press fitting. The shaft member 202 is fitted into the bearing hole 102 while the shaft member 202 is fitted into the bearing hole 302 and the guide portion 303, thereby allowing the aperture plate 200 to rotate about the shaft member 202.

The operational range of the aperture plate 200 in the optical axis direction is limited by the lower substrate 100 and the upper substrate 300, and the operational range of the aperture plate 200 in the rotating direction thereof about the shaft member 202 is limited by the positioning portion 401 and the spacer 400.

The coil 600 is configured from the core 602, which is made of a magnetic material such as Permalloy or silicon steel etc., and the coil strands 601 that are wound around the core 602. Both ends of the core 602 face the shaft member 202, which is joined to the aperture plate 200 through the guide portion 303.

As a method of forming each component, each of the lower substrate 100, the upper substrate 300, the guide portion 303 and the spacer 400 can be formed from a thin plate of a non-magnetic material such as a phosphor copper, a beryllium steel or a resin and molded by a known forming method such as press working, and these components can be joined together by an adhesive or the like. In addition, the guide portion 303 can be formed integral with the upper substrate 300 by deforming a part of the base material which corresponds to the bearing hole 302 when the bearing hole 302 is formed through the upper substrate 300.

When a cutout is formed in such a base material, a press working such as a burring process makes it possible to achieve the formation of a protrusion integrally on the base material with precision without axis misalignment.

Operations of the present embodiment of the adjustable diaphragm will be hereinafter discussed with reference to FIGS. 4 and 5.

Figure 4:
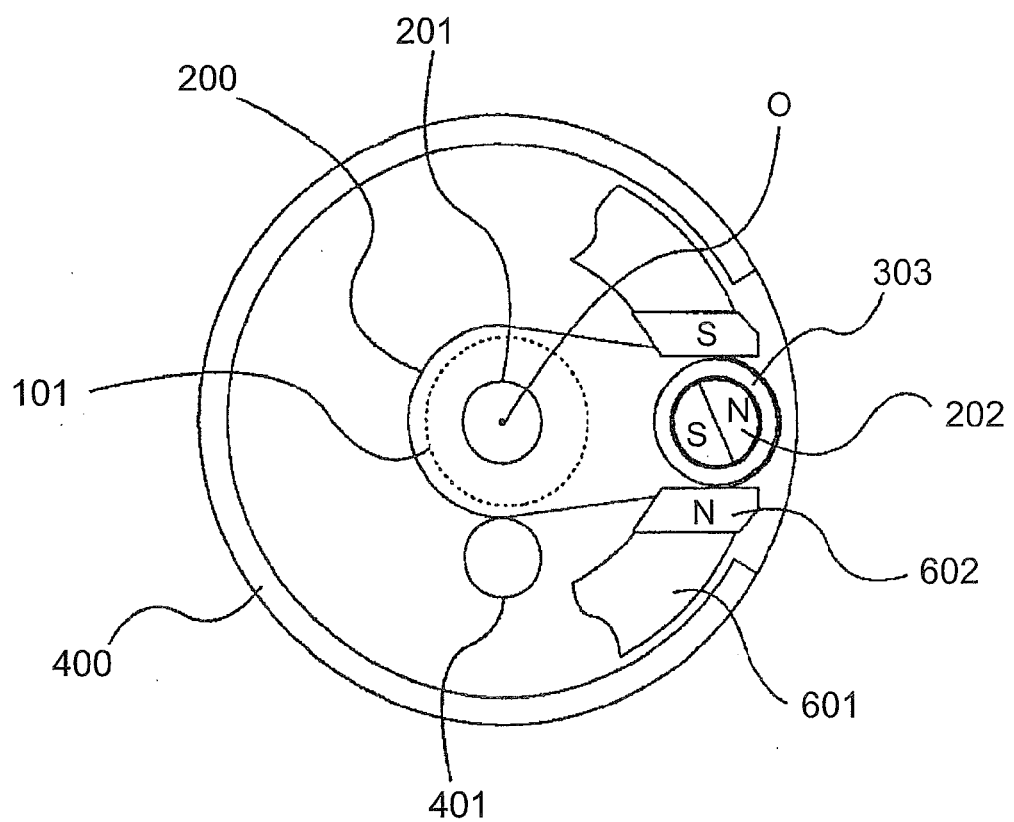
FIG. 4 is a top plan view illustrating an operation of the same light adjusting apparatus, specifically showing a stop-narrowed state (in which the center of the opening of an aperture plate is coincident with the center of the aperture)
Figure 5:
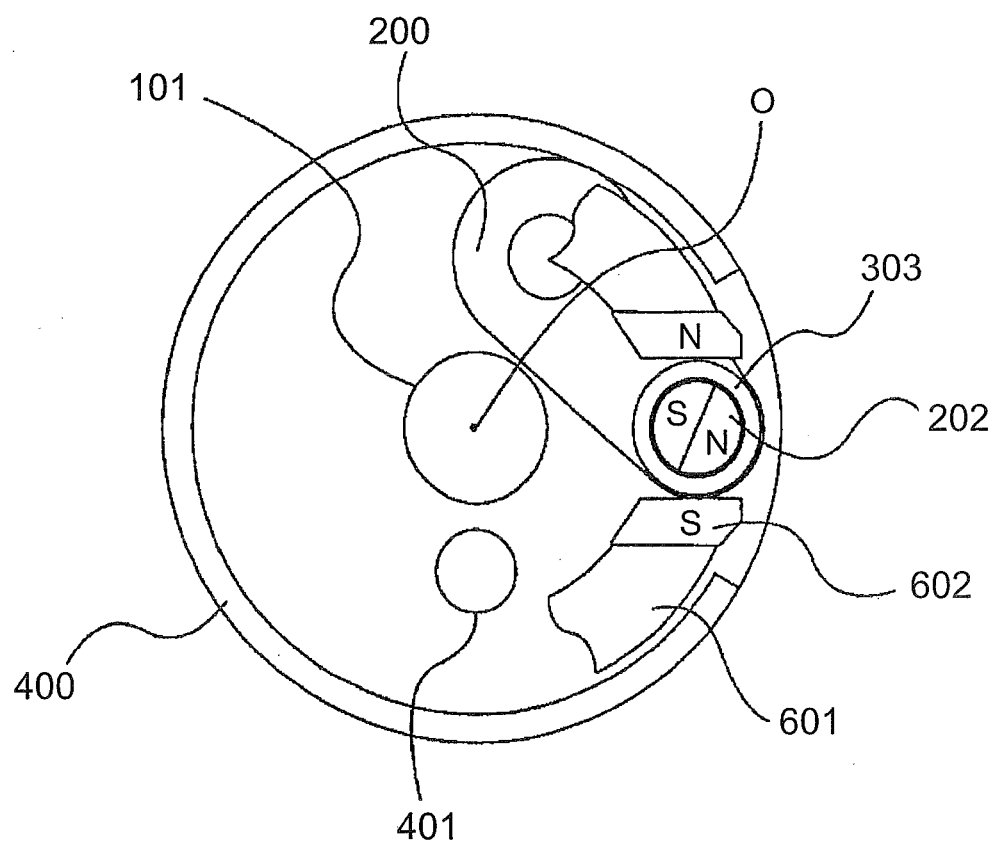
FIG. 5 is a top plan view illustrating an operation of the same light adjusting apparatus, specifically showing a state where the aperture plate is displaced from the optical aperture.

FIGS. 4 and 5 are top plan views of the present embodiment of the adjustable diaphragm with part of the upper substrate 300 and part of the coil 600 are omitted.

The shaft member 202 that is joined to the aperture plate 200 is made of a columnar magnet, and the shaft member 202 is magnetized into S-pole and N-pole in that order in an axial direction extending from the center of the second aperture 201, which is formed through the aperture plate 200, toward the shaft member 202.

On the other hand, the coil 600 is composed of the core 602, which is made of a magnetic material such as Permalloy or silicon steel etc., and the coil strands 601 that is wound around the core 602, and the coil 600 is configured so that both ends of the core 602 are alternately magnetized into the south pole and the north pole by currents passing through the coil strands 601.

In addition, due to magnetic attractive/repulsive force between the magnetic field produced by the coil 600 and the magnetic field of the shaft member 202, a torque (rotation force) is produced at the shaft member 202, so that the aperture plate 200 rotates about the shaft member 202. The direction of this rotation can be controlled by control of the direction of the current supplied to the coil strands 601.

In the case where the shaft member 202 is magnetized while both ends of the core 602 are magnetized by passing current through the coil strands 601 as shown in FIG. 4, a torque in the counterclockwise direction with respect to FIG. 4 acts on the aperture plate 200, thus causing the aperture plate 200 to rotate counterclockwise. Subsequently, the aperture plate 200 abuts against the positioning portion 401 and stops rotating counterclockwise thereupon. Consequently, the aperture plate 200 interrupts the optical path between the first aperture 101 and the third aperture 301 with the center of the second aperture 201 of the aperture plate 200 coincident with the optical axis O, thereby causing the diameter of the optical path through which the incident light passes to correspond to the diameter of the second aperture 201. It should be noted that the guide portion 303 exerts no magnetic influence though the guide portion 303 exits between the shaft member 202 and both ends of the core 602 because the guide portion 303 is made of a non-magnetic material.

On the other hand, in the case where both ends of the core 602 are magnetized as shown in FIG. 5 by passing current through the coil strands 601 in the reverse direction, a torque in the clockwise direction with respect to FIG. 5 acts on the aperture plate 200, thus causing the aperture plate 200 to rotates clockwise. Subsequently, the aperture plate 200 abuts against the spacer 400 and stops rotating clockwise thereupon, and consequently the aperture plate 200 retracts from the first aperture 101 and the third aperture 301, thereby causing the diameter of the optical path through which the incident light passes to correspond to the diameters of the first aperture 101 and the third aperture 301.

In this manner, the diameter of the optical path through which the incident light on the adjustable diaphragm passes can be controlled in two steps by rotations of the aperture plate 200 about the shaft member 202 in the present embodiment of the adjustable diaphragm.

Effects of the present embodiment of the adjustable diaphragm will be described hereinafter.

In the present embodiment of the adjustable diaphragm, it is ideal that the force produced by the magnetic interaction between the shaft member 202 and the coil 600 be converted solely into a torque of the shaft member 202 and that other components of force be canceled out.

However, due to non-uniformity of the magnetized state of the shaft member 202, non-uniformity of the magnetic fields produced at both ends of the core 602, assembling errors and others, a magnetic force attracting the shaft member 202 toward the core 602 is produced at the shaft member 202 in addition to the torque produced thereat.

If such a force other than torque acts on the shaft member 202, the aperture plate 200 tilts in between the lower substrate 100 and the upper substrate 300, which may cause an obstacle to the rotational movement of the aperture plate 200.

For this reason, by providing the upper substrate 300 with the guide portion 303 to sheathe the shaft member 202 with the guide portion 303 in a manner such as described above, the shaft member 202 (the aperture plate 200) can be prevented from tilting, which consequently makes it possible to stabilize the rotational movement of the aperture plate 200.

Accordingly, the guide member 303 is a member which guides rotation of the shaft member 202 while suppressing vibrations (tilting) of the rotation axis of the shaft member 202 to a predetermined degree relative to an axis which passes through the center of the shaft hole 302 and which is orthogonal to a plane of the upper substrate 300.

However, the guide member 303 does not prevent the shaft member 202 from moving freely in the axial direction thereof (direction along the rotation axis of the aperture plate 200) relative to the upper substrate 300.

In addition, because of the integral formation of the guide portion 303 with the upper substrate 300, the bearing hole 302, which is formed through the upper substrate 300, and the guide portion 303, which is formed on the upper substrate 300, are mutually identical in inner diameter, so that no positional deviation occurs between the bearing hole 302 and the guide portion 303.

Figure 10:
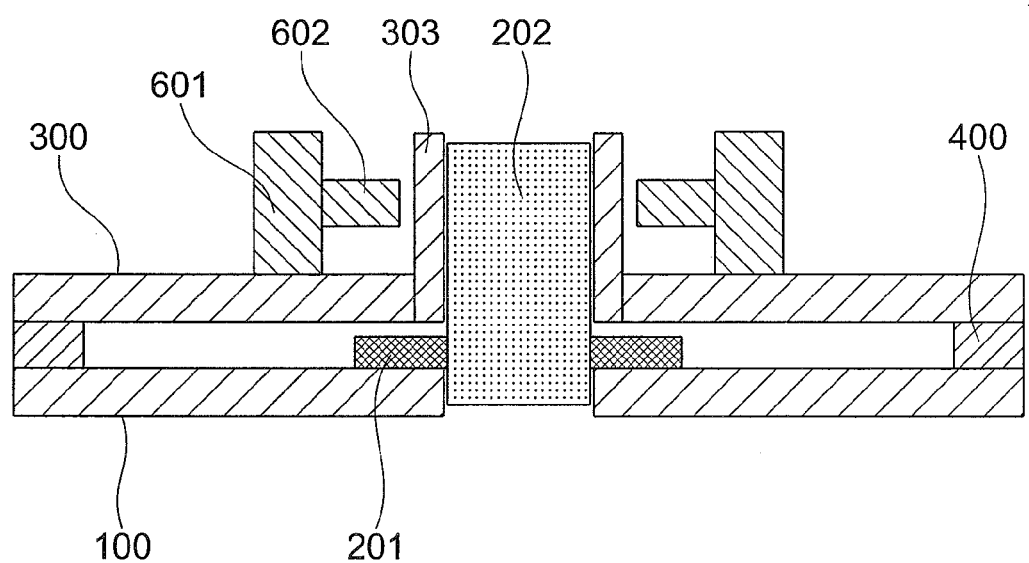
FIG. 10 is a cross sectional view showing another example of the shape of the guide portion serving as en element of the first embodiment of the light adjusting apparatus.

On the other hand, in the case where the guide portion 303 is formed independently of the upper substrate 300, by joining the guide portion 303 to the upper substrate 300 so as to penetrate the upper substrate 300 as shown in FIG. 10, thereby no positional deviation occurring between the aforementioned bearing hole and the guide portion 303, since the bearing hole 302 formed on the upper substrate 300 corresponds to inner wall of the guide portion 303.

In addition, the effect of suppressing the inclination of the shaft member 202 becomes maximum by making the height of the guide portion 303 substantially identical to the amount of projection of the shaft member 202 from the upper substrate 300; however, it goes without saying that a certain degree of effect can be expected even if the height of the guide portion 303 is smaller than the amount of projection of the shaft member 202 from the upper substrate 300.

Additionally, since the adjustable diaphragm is structured so that the guide portion 303 supports the shaft member 202 in a manner to allow the shaft member 202 to rotate freely while suppressing misalignment of the axis of the shaft member 202 to a predetermined degree, the degree of contribution of the shaft hole 102 to suppression of, e.g., misalignment of the axis of the shaft member 202 can be reduced. Accordingly, one does not need to be so nervous about machining accuracy of the shaft hole 102 and assembling accuracy such as relative positional deviation between the lower substrate 100 and the upper substrate 300, and the present embodiment of the adjustable diaphragm can be easily assembled with high accuracy maintained.

Additionally, in the configuration shown in the present embodiment, no support members for the shaft member 202 exist on the exterior side of either end of the shaft member 202 in the optical axis direction, which makes it possible to reduce the size of the adjustable diaphragm to a minimum in the optical axis direction.

Figure 6:
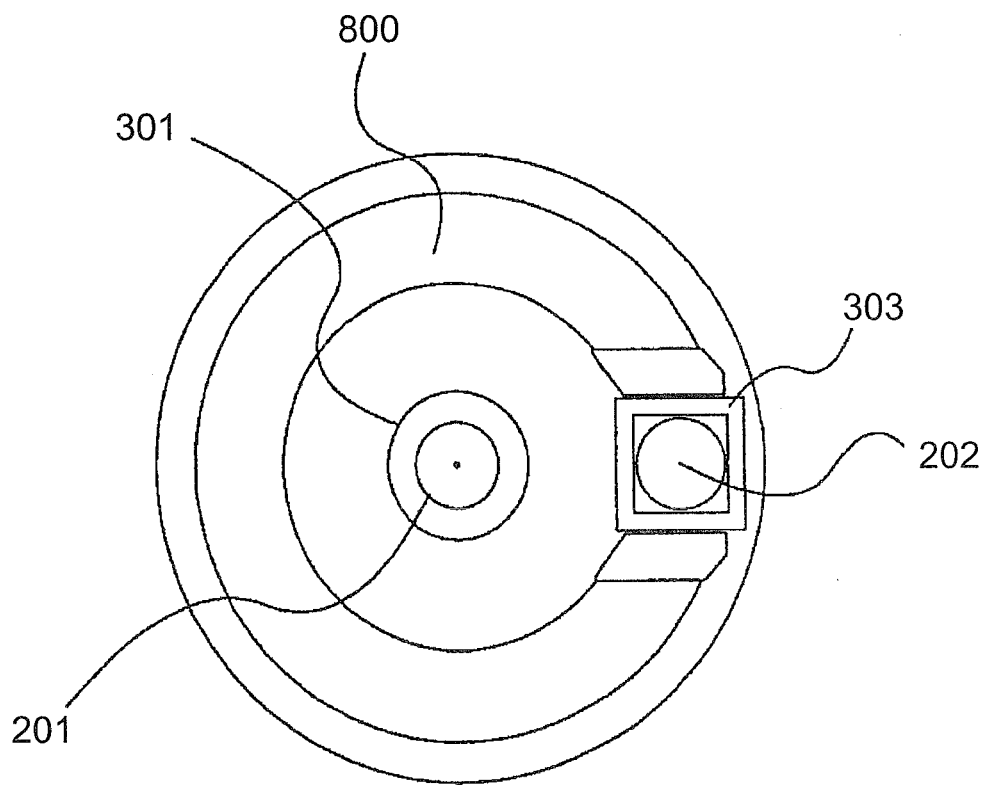
FIG. 6 is an illustration showing another example of the shape of a guide portion of the same light adjusting apparatus.
Figure 7:
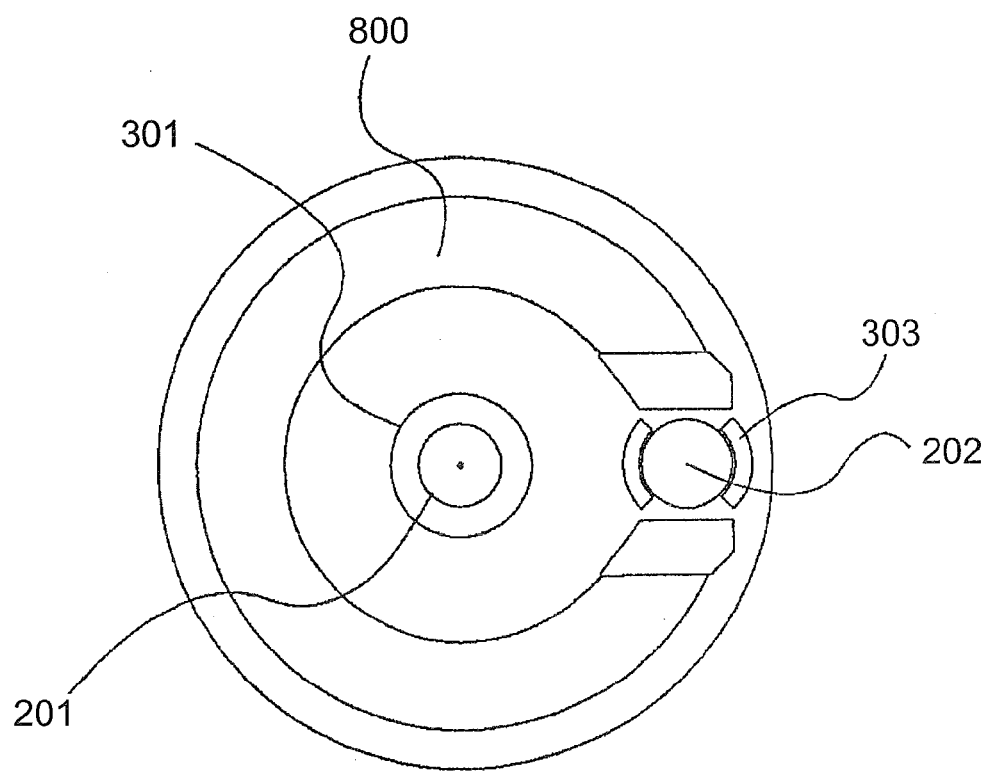
FIG. 7 is an illustration showing still another example of the shape of the guide portion of the same light adjusting apparatus.

Additionally, the guide portion 303 can be formed into any shape other than a cylindrical shape as shown in FIG. 6; moreover, as shown in FIG. 7, the guide portion 303 can be divided to a degree not impairing the functionality of the guide portion 303.

Additionally, the structure according to the present embodiment can also be applied to a multi-step adjustable diaphragm which makes selection between different aperture sizes possible if combinations of coils and aperture plates having apertures of different sizes are coaxially provided.

Additionally, the above described embodiment of the adjustable diaphragm can be modified to be used as an optical-lens insertion/removal apparatus by replacing the aperture plate of the above described embodiment of the adjustable diaphragm by an optical lens.

Additionally, the above described embodiment of the adjustable diaphragm can be modified to be used as an optical-filter insertion/removal apparatus for varying the transmitted light volume or the wavelength region by replacing the aperture plate of the above described embodiment of the adjustable diaphragm by an optical filter.

The upper substrate, the lower substrate and the aperture plate in the present embodiment of the adjustable diaphragm correspond to a first substrate, a second substrate and an incident light adjuster, respectively.

<Second Embodiment>

A second embodiment of the light adjusting apparatus (adjustable diaphragm) will be hereinafter discussed with reference to FIG. 8.

Figure 8:
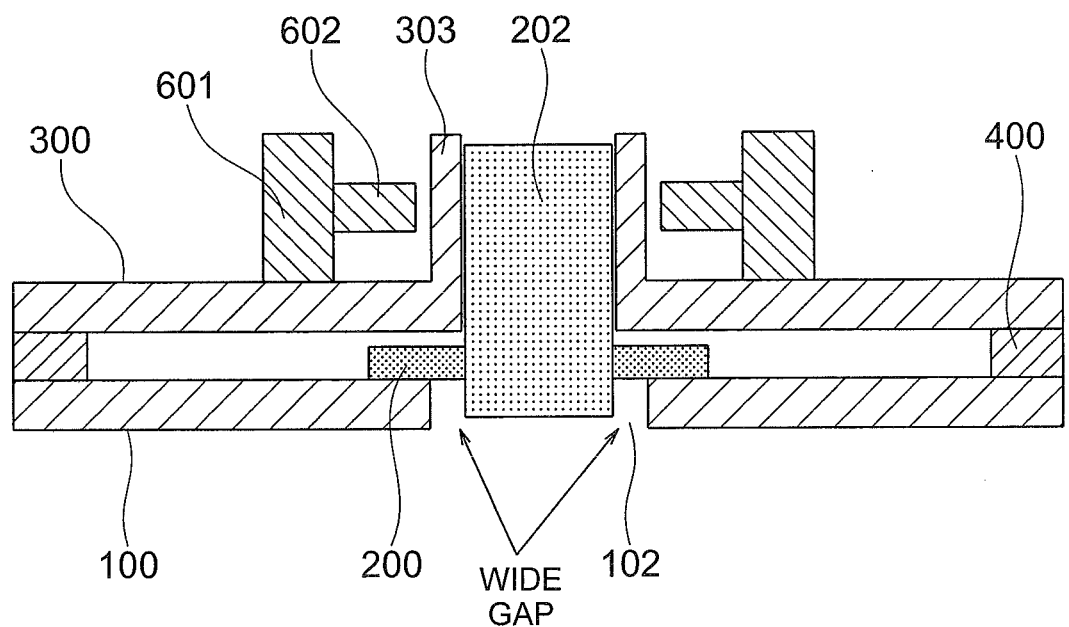
FIG. 8 is a cross sectional view of a second embodiment of the light adjusting apparatus (adjustable diaphragm), taken along the plane A shown in FIG. 1 in which the rotation axis of the shaft member lies.

Similar to FIG. 3, FIG. 8 shows a cross sectional view of the second embodiment of the adjustable diaphragm, taken along the plane A shown in FIG. 1 in which the rotation axis of the shaft member 202 lies.

As shown in FIG. 8, this embodiment of the adjustable diaphragm is configured such that the bearing hole 102 that is formed through the lower substrate 100 is greater in diameter than either of the following two inner walls: the inner wall of the bearing hole 302 that is formed through the upper substrate 300 and the inner wall of the guide portion 303 that is formed on the upper substrate 300.

As an example of a procedure for assembling the second embodiment of the adjustable diaphragm, the following assembling procedure is possible: firstly joining the spacer 400 to the upper substrate 300, subsequently inserting the shaft member 202 into the shaft hole 302 and the guide portion 303 of the upper substrate 300, and thereafter joining the lower substrate 100 and the spacer 400 to each other while inserting the shaft member 202 into the bearing hole 102 of the lower substrate 100 with the aperture substrate 200 installed in place.

In such an assembling procedure, the insertion operation of the shaft member 202 can be made easy to a great extent by increasing the diameter of the bearing hole 102 that is formed through the lower substrate 100.

The magnetic attractive/repulsive force between the magnetic field produced by the coil 600 and the magnetic field of the shaft member 202 becomes maximum at a site where the shaft member 202 and the core 602 face each other, and at this site movement of the shaft member 202 in directions other than the rotation direction thereof is restricted in the guide portion 303.

Therefore, even if the diameter of the bearing hole 102 that is formed through the lower substrate 100 is increased, the effect on the rotational movement of the aperture plate 200 is little.

Accordingly, the guide member 303 is a member which guides rotation of the shaft member 202 while suppressing vibrations (tilting) of the rotation axis of the shaft member 202 to a predetermined degree relative to an axis which passes through the center of the shaft hole 302 and which is orthogonal to a plane of the upper substrate 300.

However, the guide member 303 does not prevent the shaft member 202 from moving freely in the axial direction thereof (direction along the rotation axis of the aperture plate 200) relative to the upper substrate 300.

<Third Embodiment>

A third embodiment of the light adjusting apparatus (adjustable diaphragm) will be hereinafter discussed with reference to FIG. 9.

Figure 9:
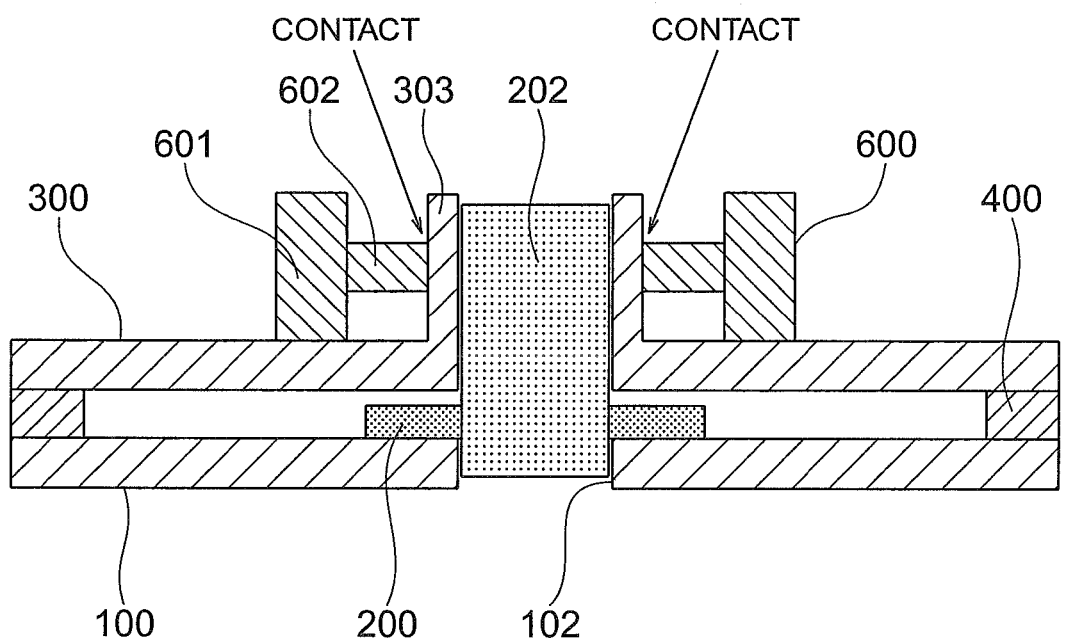
FIG. 9 is a cross sectional view of a third embodiment of the light adjusting apparatus (adjustable diaphragm), taken along the plane A shown in FIG. 1 in which the rotation axis of the shaft member lies.

Similar to FIG. 3, FIG. 9 shows a cross sectional view of the third embodiment of the adjustable diaphragm, taken along the plane A shown in FIG. 1 in which the rotation axis of the shaft member 202 lies.

As shown in FIG. 9, in the third embodiment of the adjustable diaphragm, the coil 600 is installed with both ends of the core 602 in contact with the outer wall of the guide portion 303.

In the third embodiment of the adjustable diaphragm, to keep the magnetic field produced by the coil 600 and the magnetic field of the shaft member 202 in equilibrium is an important factor in rotating the aperture plate 200 with stability.

It is desirable that the equilibrium point of the magnetic field of the coil 600 be located at the middle point between both ends of the core 602 and that this point be coincident with the axis of the shaft member 202.

Accordingly, the rotational movement of the aperture plate 200 can be stabilized by making the axis of the shaft member 202 coincident with the middle point between both ends of the core 602 easily by bringing both ends of the core 602 into contact with the guide portion 303 as shown in the third embodiment of the adjustable diaphragm.

The present invention is not limited to the particular embodiments described above. Various changes and modifications may be made without departing from the spirit and scope of the invention.

As described above, the adjustable diaphragm according to the present invention is useful for a light adjusting apparatus which is easy to assemble and the product accuracy of which is easy to maintain at a high level though simple in structure, low in production cost, light in weight, compact in size and small in thickness.

According to the present invention, it is possible to provide a light adjusting apparatus which is easy to assemble and the product accuracy of which is easy to maintain at a high level though simple in structure, low in production cost, light in weight, compact in size and small in thickness.

What is claimed is:

1. A light adjusting apparatus comprising:
   a first substrate and a second substrate at least one of which has an aperture;
   a spacer which defines a distance between the first substrate and the second substrate;
   at least one incident light adjuster which includes a shaft member as a center of rotation and rotates between the first substrate and the second substrate in a plane orthogonal to an optical axis direction, a magnet being formed on at least part of the shaft;
   at least one driving device which includes a coil formed separately from the magnet, and drives the incident light adjuster; wherein
   the driving device rotates the incident light adjuster between a position at the aperture and a position to retract from the position of the aperture, further comprising
   a guide portion which is formed on the first substrate to restrict movement of the shaft member in directions other than a rotation direction thereof; and
   wherein both ends of the coil are in contact with an outer wall of the guide portion.

2. The light adjusting apparatus according to claim 1, wherein the guide portion restricts the movement of the shaft member in the directions on an inner wall side of the guide portion.

3. The light adjusting apparatus according to claim 2, wherein both ends of the coil face the magnet through at least part of the guide portion.

4. The light adjusting apparatus according to claim 3, wherein the guide portion is made of a non-magnetic material.

5. The light adjusting apparatus according to claim 1, wherein the guide portion is formed into a separate member from the first substrate.

6. The light adjusting apparatus according to claim 1, wherein the guide portion is formed integrally with the first substrate by deforming a part of the first substrate.

7. The light adjusting apparatus according to claim 6, wherein the inner wall of the guide portion is smaller in dimension than an opening formed through the second substrate, the shaft member being inserted into the opening.

8. The light adjusting apparatus according to claim 7, wherein an aperture is formed through the incident light adjuster.

9. The light adjusting apparatus according to claim 8, wherein the incident light adjuster comprises a lens.

10. The light adjusting apparatus according to claim 9, wherein the incident light adjuster comprises an optical filter.

11. The light adjusting apparatus according to claim 1, wherein both ends of the coil face the magnet through at least part of the guide portion.

12. The light adjusting apparatus according to claim 1, wherein the guide portion is made of a non-magnetic material.

13. The light adjusting apparatus according to claim 1, wherein the guide portion is formed into a separate member from the first substrate.

14. The light adjusting apparatus according to claim 1, wherein the guide portion is formed integrally with the first substrate by deforming a part of the first substrate.

15. The light adjusting apparatus according to claim 1, wherein an inner wall of the guide portion is smaller in dimension than an opening formed through the second substrate, the shaft member being inserted into the opening.

16. The light adjusting apparatus according to claim 1, wherein an aperture is formed through the incident light adjuster.

17. The light adjusting apparatus according to claim 1, wherein the incident light adjuster comprises a lens.

18. The light adjusting apparatus according to claim 1, wherein the incident light adjuster comprises an optical filter.

* * * * *